(12) United States Patent
Panchbudhe et al.

(10) Patent No.: US 7,716,189 B1
(45) Date of Patent: May 11, 2010

(54) METHOD FOR PRESERVING RELATIONSHIPS/DEPENDENCIES BETWEEN DATA IN A FILE SYSTEM

(75) Inventors: Ankur P. Panchbudhe, Nagpur (IN); Veeral P. Shah, Mumbai (IN); Amol S. Katkar, Punc (IN)

(73) Assignee: Symantec Operating Corporation, Cupertino, CA (US)

( * ) Notice: Subject to any disclaimer, the term of this patent is extended or adjusted under 35 U.S.C. 154(b) by 260 days.

(21) Appl. No.: 11/415,772

(22) Filed: May 2, 2006

Related U.S. Application Data

(63) Continuation of application No. 11/234,367, filed on Sep. 23, 2005.

(51) Int. Cl.
*G06F 7/00* (2006.01)

(52) U.S. Cl. .................. 707/691; 707/812

(58) Field of Classification Search .......... 707/100, 707/102, 104.1, 200
See application file for complete search history.

(56) References Cited

U.S. PATENT DOCUMENTS

| | | | | |
|---|---|---|---|---|
| 5,305,450 A | * | 4/1994 | Naito et al. ................ | 717/172 |
| 5,749,079 A | * | 5/1998 | Yong et al. ................ | 707/100 |
| 2002/0042796 A1 | * | 4/2002 | Igakura ..................... | 707/205 |
| 2002/0158909 A1 | * | 10/2002 | Negishi et al. ............. | 345/769 |
| 2004/0249822 A1 | * | 12/2004 | Keohane et al. ........... | 707/100 |
| 2004/0261079 A1 | * | 12/2004 | Sen ........................... | 719/310 |
| 2005/0114847 A1 | * | 5/2005 | Whalley .................... | 717/140 |
| 2005/0192922 A1 | * | 9/2005 | Edlund et al. ................ | 707/1 |
| 2006/0106841 A1 | * | 5/2006 | Bybee et al. ............... | 707/101 |
| 2006/0195834 A1 | * | 8/2006 | Nichols et al. ............ | 717/168 |
| 2006/0253502 A1 | * | 11/2006 | Raman et al. .............. | 707/202 |
| 2007/0033234 A1 | * | 2/2007 | Murakami et al. ......... | 707/200 |
| 2008/0040483 A1 | * | 2/2008 | Nakatani et al. ........... | 709/226 |

* cited by examiner

*Primary Examiner*—Don Wong
*Assistant Examiner*—Angela M Lie
(74) *Attorney, Agent, or Firm*—Campbell Stephenson LLP

(57) ABSTRACT

An apparatus or method for preserving the relationships or dependencies between content of files in a file system or between content of files in separate file systems. The preservation of relationships or dependencies may require the preservation of the files and their content as well. In one embodiment, the method includes receiving a first instruction that, when implemented, performs an operation involving a first file in a file system, wherein the first file is related to the second file. In response to receiving the first instruction, a second instruction is selected that, when implemented, performs a second operation involving the first file or a second file, wherein the second instruction is implemented before or after implementing the first instruction.

11 Claims, 3 Drawing Sheets

| ENTRY | ENTRY NAME | RELATIONSHIP | ENTRY NAME |
|---|---|---|---|
| 1 | RMS | Needed-by | RDS |
| 2 | A | Needed-by | App Z |
| 3 | B | Needed-by | App Z |
| 4 | SC | Needed-by | BB |
| 5 | D | Installed-by | App Z |
| 6 | E | Installed-by | App Z |
| 7 | H | Belongs-to | I |
| 8 | J | Refers-to | K |
| ⋮ | ⋮ | ⋮ | ⋮ |
| n | F1 | Needed-by | F2 |

METHOD FOR PRESERVING RELATIONSHIPS/DEPENDENCIES BETWEEN DATA IN A FILE SYSTEM

CROSS-REFERENCE TO RELATED APPLICATIONS

The present patent application is a continuation of U.S. patent application Ser. No. 11/234,367, filed on Sep. 23, 2005, entitled "Method for Preserving Relationships/Dependencies Between Data in a File System" and is incorporated by reference herein in its entirety and for all purposes.

BACKGROUND OF THE INVENTION

Hard disks are commonly used to store content (e.g., data, applications, executables, libraries, etc.) used by computer systems. Usually, the only way to access content stored on a hard disk is by specifying its physical location (in terms of cylinder, head, and sector). File systems were invented to more easily track content stored on hard disks. A file system, as its name implies, treats different sets of content as files. Each file is separate from others. Over and above content stored within it, each file includes or is associated with additional data including the file's name, the file's access permissions, the date and time of the file's creation, access, modification, etc.

While file systems in the past have included no more complexity than that already mentioned, present-day file systems include mechanisms that make it easier to group files together. The most commonly used mechanism to group files is the directory. Often implemented as a special type of file, directories make it possible to make hierarchical structures of files and directories. While most files have these attributes in common, they vary in implementation details, meaning that not all file systems can be accessed by all operating systems. Some operating systems (e.g., Linux-based operating systems) include support for many popular files systems, making it possible to easily access the file systems of other operating systems.

File systems can be accessed, modified, etc., using file system instructions. For example, the "create" file system instruction allows a new file to be made within a file system. The create instruction is useful, for example, when a new file is saved. The create instruction can change directory entries as well as set up memory space for a new file in the file system. A "delete" file system instruction removes a file from a file system. The space used by the deleted file will be returned to the free space available to the file system. In a file system where the filename is stored along with the file, the "rename" file system instruction will change this. The "open" file system instruction opens a file in preparation for reading the contents of the file, writing new content to the file, appending to the file, etc. The "close" file system instruction closes a file after some action (e.g., for reading the contents of the file, writing new content to the file, appending to the file, etc) has occurred. The "read" file system instruction reads content from a file into buffers within a process. A "write" file system instruction will cause new content to be written to a file. Access to a file will be controlled by permissions attached or associated with the file. Additional file system instructions are contemplated.

Content within a file may have a relationship or dependency with content in one or more other files in the same file system or other file systems. Additionally, content within a file may have a relationship with an entity (e.g., an application, a user, etc.) not contained in a file. Examples of dependencies or relationships include: a "needed-by" relationship between an entity such as an executable or library and a configuration file; a "used-by" relationship between contents of files or between the content of a file and an entity such as an application; a "refers-to" relationship between content in files or between content in a file and another entity; a "group-by" relationship between files or between a file and another entity.

Many of these file relationships should be preserved to insure proper operation of computer systems. Unfortunately, the relationships between files or between a file and another entity can be unwittingly lost when file system instructions are implemented. To illustrate, consider an HTML file (i.e., a web page) that contains a link to content within a second file, thus creating a "refers-to" relationship between the HTML file and the second file. If a file system instruction, when implemented, renames the second file, the link within the HTML file will become invalid, and the relationship between the files will be lost. In another example, suppose content in file F1 is "needed-by" content of another file F2 such that F1 should not be deleted before F2. If a file system instruction, when implemented, deletes F1 before F2, the needed-by relationship between F1 and F2 will be lost. Accordingly, a method or apparatus is needed which functions to maintain or preserve relationships between files or between files and other entities (e.g., applications, users, etc.) that can otherwise be lost when a file system instruction is implemented.

SUMMARY OF THE INVENTION

An apparatus or method for preserving the relationships or dependencies between content of files in a file system or between content of files in separate file systems. The apparatus or method is also capable of preserving the relationships or dependencies between content of files and entities (e.g., applications, users, etc.) which are not stored in a file of a file system. The preservation of relationships or dependencies may require the preservation of the files and their content as well. In one embodiment, the method includes receiving a first instruction that, when implemented, performs an operation involving a first file in a file system, wherein the first file is related to the second file. In response to receiving the first instruction, a second instruction is selected that, when implemented, performs a second operation involving the first file or a second file, wherein the second instruction is implemented before or after implementing the first instruction.

BRIEF DESCRIPTION OF THE DRAWINGS

The present invention may be better understood, and its numerous objects, features, and advantages made apparent to those skilled in the art by referencing the accompanying drawings.

Figure 1:
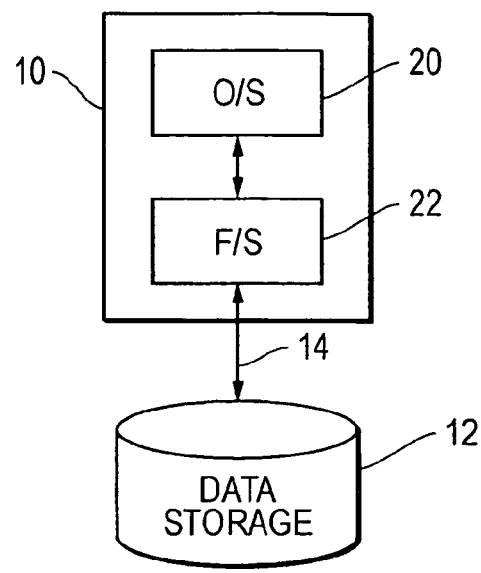
FIG. 1 is a block diagram illustrating relevant components of an exemplary computer system employing one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

The present invention provides an apparatus or method for preserving the relationships or dependencies between content of files in a file system or between content of files in separate file systems. The apparatus or method is also capable of preserving the relationships or dependencies between content of files and entities (e.g., applications, users, etc.) other than files of a file system. In the following description, a preferred embodiment of the present invention would ordinarily be implemented as a computer program executing on one or more computer systems, although one skilled in the art will readily recognize that the equivalent of such computer program may also be constructed in hardware. If the invention is implemented as a computer program, the program may be stored as instructions in a conventional computer readable medium that may include, for example: magnetic storage media such as a magnetic disk (e.g., a floppy disk or a hard disk), or magnetic tape; optical storage media such as an optical disk, optical tape, or machine readable bar code; solid state electronics storage devices such as random access memory (RAM) or read-only memory (ROM); or any other device or medium employed to store computer executable instructions. The computer readable medium that stores the computer executable instructions may be part of the computer system that executes the instructions.

FIG. 1 is a block diagram illustrating relevant components of a computer system 10. Computer system 10 is coupled to external data storage 12 via communication link 14. In another embodiment, data storage 12 may be included as a component (e.g., hard disk) within computer system 10. Although not shown in FIG. 1, data storage 12 may include several physical storage devices (e.g., disk arrays) accessible via a storage area network (SAN). A volume manager (not shown) may present the physical storage devices as one or more virtual storage devices. Data storage device 12 offers access to fixed sized memory blocks (either physical or virtual). The fixed sized memory blocks presented by data storage device 12 can be used to store content of files and directories or databases more fully described below.

Computer system 10 includes an operating system 20 coupled to file system 22. In another embodiment, the file system 22 may be incorporated within the operating system. In yet another embodiment, the file system may be coupled to a database management system. However, for the purposes of explanation only, it will be presumed that no database system is positioned between the file system 22 and data storage 22. Both operating system 20 and file system 22 take form in software instructions executing on one or more processors. In one embodiment, file system 22 is implemented using an application such as the VERITAS file system (available from VERITAS Software Corporation of Mountain View, Calif., now a part of Symantec Corporation), which executes on a single computer system such as computer system 10 shown in FIG. 1. In other embodiments, file system 22 is a distributed file system that is implemented by executing an application such as VERITAS cluster file system (available from VERI-TAS Software Corporation of Mountain View, Calif.) on each of several independent computer systems.

File system 22 receives file system instructions from operating system 20. File system 22 may also receive file system instructions generated by an application or user. In response to receiving a file system instruction, file system 22 can generate one or more file system transactions that implement the received file system instruction.

File system 22 organizes and manages files and/or directories (a directory is a special type of file) that store content. While it is said that files and/or directories store content, in reality the content is stored in the fixed sized real or virtual memory blocks presented to and used by file system 22. A set of one more directories and/or files organized by file system 22 can also be referred to as a file system.

Figure 2:
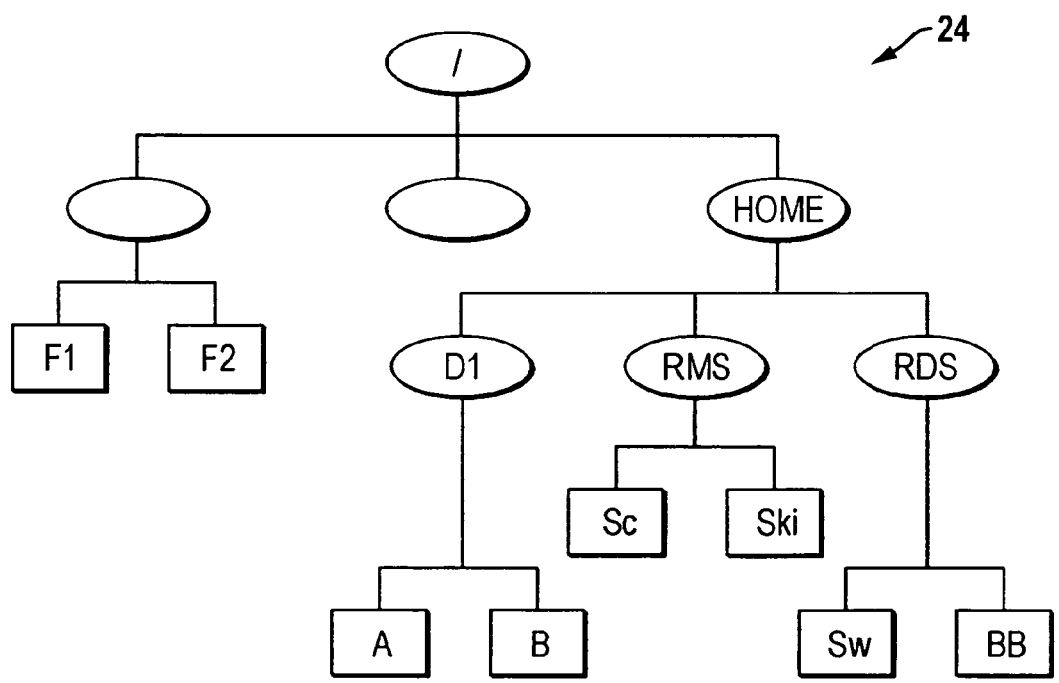
FIG. 2 is a graphical representation of an exemplary file system.

Storage device 12 stores the contents of files such as files of exemplary file system 24 shown in FIG. 2. A file system, such as file system 24, need not include any user files (e.g., when the file system is created the file system may include only a single file, which defines the root directory of the file system). File system 22 is capable of creating, moving, or deleting files and/or directories within file system 24 in response to implementing respective file system instructions received externally (e.g., from operating system 20) or generated internally.

File system instructions implemented by file system 22 enable content to be written to or read from a file of a file system. Files or directories can be moved or copied by implementing other file system instructions. Other file system instructions are contemplated including those, which when implemented, read or write file attributes. As noted above, however, many of file system instructions, when implemented, may adversely impact needed, existing relationships between files or between files and entities other than files. In other words, a needed file relationship may, be lost as a result of implementing a file system instruction, such as a delete file instruction.

Figures 3, 4:
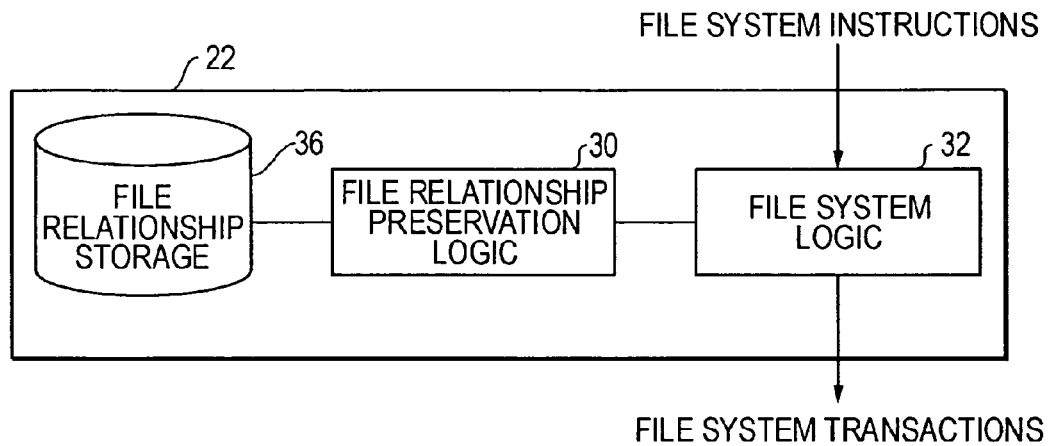
FIG. 3 is a block diagram illustrating relevant components of a file system employing one embodiment of the present invention.
FIG. 4 is a graphical representation of a file relationship table according to one embodiment of the present invention.

FIG. 3 shows relevant components of one embodiment of the file system 22 shown within FIG. 1. File system 22 shown in FIG. 3 includes file relationship preservation logic 30 coupled to file system logic 32 via a communication link. In general, file relationship preservation logic 30 operates to preserve existing relationships between files of the same file system, between files of different file systems, or between files and entities other than files of a file system. It should be noted that file relationship preservation logic 30 need not be a component of file system 22 in order to implement the present invention. Rather, file relationship preservation logic can be a set of user defined, pluggable modules that are external to and useable by file system logic 32 as will be more described below.

File system 22 also includes a file relationship storage device 36 in data communication with relationship preservation logic 30. In general, file relationship storage device 36 stores file relationships sought to be preserved. It is noted that the file relationship storage device 36 need not be a component of file system 22. For example, the contents of file relationship storage 36 may be persistently stored in storage device 12 as a database. Alternatively, the contents of file relationship data storage 36 may be persistently stored as metadata, tags or attributes for respective files such as files of file system 24, and accessible as such by file relationship preservation logic 30. For purposes of explanation, the present invention will be described with reference to file relationship preservation logic 30 having access to the contents of relationship data storage 36, which persistently stores file relationships sought to be preserved. Regardless of how the file relationships are stored, the relationship store should allow querying of the relationships and their attributes, and allow for the creation and modification of relationships Data storage 36 may store one or more file relationship tables such as file relationship table 40 shown within FIG. 4. File relationship tables identify relationships sought to be preserved between files in the same or different file systems or between files and other entities. In the illustrated example, file relationship table 40 includes n entries, each of which identifies a relationship involving a file, it being understood that the present invention should not be limited thereto. File relationship storage 36 could store several, related tables of file relationships. For example, suppose clusters or groups of files are maintained in a file system. Clustering of files is done automatically based on the contents of the file. Every time a file is written, in the post processing of the file system close operation, the contents of the file may be reviewed to see if it should continue to be a part of the cluster. In this case, it may be necessary to store the names of clusters and files belonging to each cluster in separate tables within file relationship storage 36. The relationship could be backed up together during a backup operation. A change in one table may imply a change in another table. For example, if all files of cluster "green" are deleted, the entry "green" need not be in the table of clusters.

Each of the n entries shown in FIG. 4 includes at least one identifier (e.g., a file path name) of a file and its relationship (e.g, needed-by, refers-to, etc.) with another file or other entity. For example, the first entry within table 40 indicates the content of file RMS of file system 24 has a "needed-by" relationship or dependency with the content of file RDS, also in file system 24.

The entries of a file relationship table, such as file relationship table 40 shown in FIG. 4, can be established in one of several ways. Using APIs, commands, or a GUI, a user or an application executing on computer system 10 can identify a relationship between files or between a file and another entity, and store the identified relationship within an entry of a file relationship table along with the identifiers of the files and/or other entities that share the relationship. For example, during installation of an application z on computer system 10, files installed by the application z can be identified as such or as "needed by" application z. In addition to installing the files, application z can store in relationship table 40, the relationship between itself and the files it installs or the relationship between files that application z installs. A user can identify a relationship between files or between a file and another entity, and store the identified relationship within an entry of file relationship table. For example, using content parsing, a user of computer system 10 can peek into files and derive their relationships from their contents. A user can create a functional dependency graph that identifies how files are dependent on each other or other entities. If one file needs another file or entity to complete its function, there is a dependency edge between the two files. An example is a program, which starts with a main function and then calls functions, which in turn, can call other functions. A dependency graph would start from the main function and link it to the function it calls, and so on. Similarly, a functional dependency graph can be created between a program file and a set of libraries, depending on how the libraries are used. Once relationships are mapped out, user can create entries in a file relationship table that include the identities of the files that are related or the identities of a file and other entities that share relationships, along with a description of the relationship.

The file relationship preservation logic 30, in one embodiment, may take form in one or more pluggable modules. These pluggable modules could be defined (i.e., implemented) and installed by a user of the file system. The file relationship preservation logic of one computer system may have pluggable modules that function differently when compared to the pluggable modules of file relationship preservation logic within another computer system. As an aside, file relationship preservation logic 30 may be unique to each user of computer system 10. Each pluggable module can be implemented as a kernel module or as instructions in user space, written specifically to preserve an existing relationship of a file to another file or other entity (e.g., a database, user, application, etc.). The pluggable modules could be unique to a file system instruction or in some cases to individual files. In general, however, the pluggable modules can query the relationship database 36 and generate file system instructions that when executed, preserve relationships between files or between a file and another entity. In one embodiment, each of the pluggable modules corresponds to a respective file system instruction. For example, a pluggable module in file relationship preservation logic 30 may be configured to ensure that the "rename" file system instruction doesn't destroy a needed relationship between files or between files and another entity.

Figure 5:
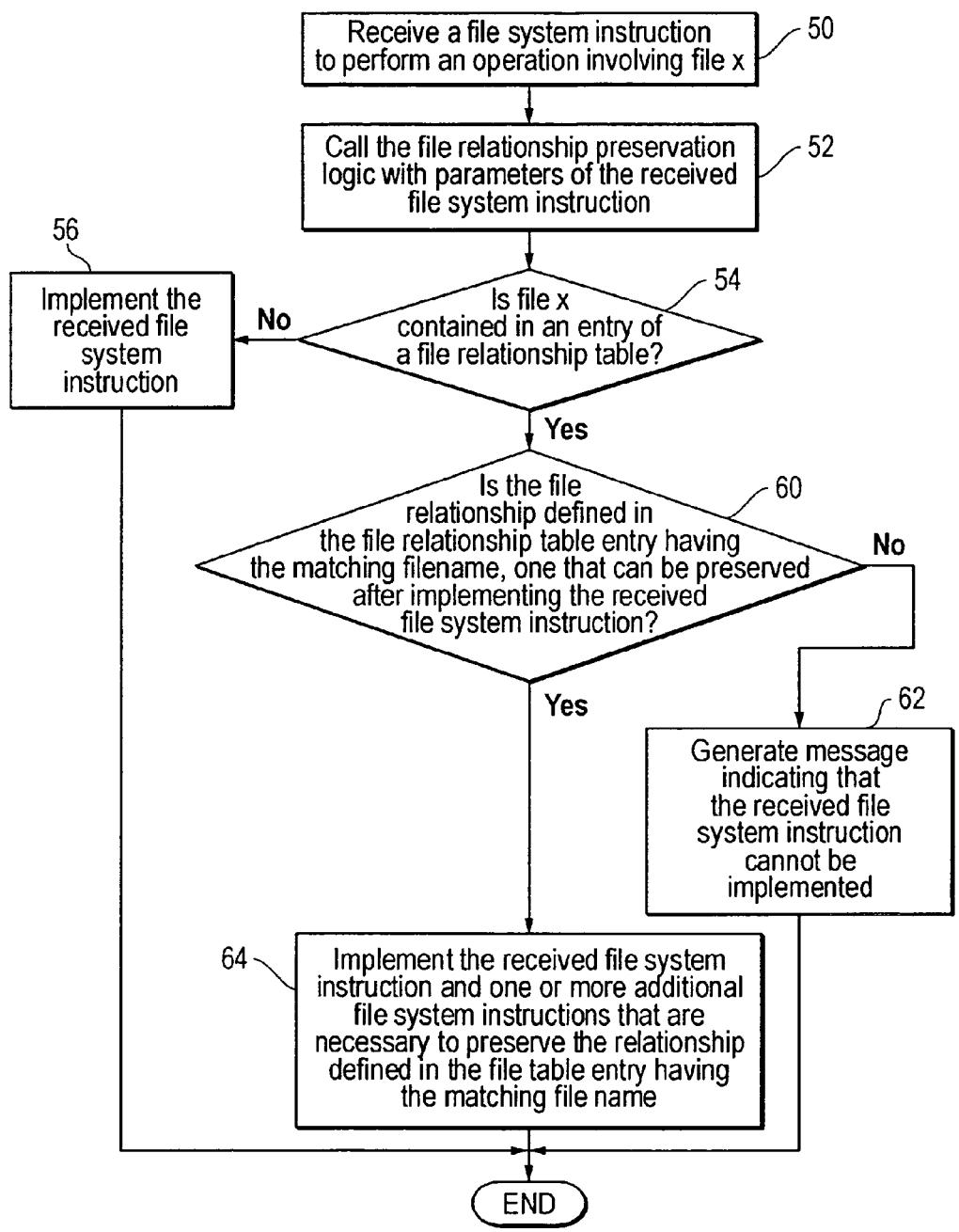
FIG. 5 is a flow chart showing relevant aspects of a method for preserving file relationships according to one embodiment of the present invention.

File system 22 is coupled to receive file system instructions from, for example, operating system 20. File system operations (e.g., delete file, rename file, etc.) are performed on files within file system 24 and/or other file systems via file system transactions in order to implement received file system instructions. Relationship preservation logic 30 functions to preserve existing relationships between files of between a file and another entity before or after implementing the file system instructions. FIG. 5 is a flow chart illustrating relevant operational aspects performed by relationship preservation logic 30.

The process shown in FIG. 5 begins when file system 22 receives a file system instruction from, for example, operating system 20. For purposes of explanation only, it will be presumed that the file system instruction is one which, when implemented, performs a file system operation involving one file (e.g., file x), it being understood that the present invention should not be limited thereto. In response to receiving the file system instruction, file system logic 32 may call relationship preservation logic 30 to determine whether any additional processing should be implemented before and/or after implementing the received instruction in order to preserve a relationship, if one exists, involving file x. The call to file relationship preservation logic 30 may include parameters such as the identity (e.g., file x) of the file affected by the received file system instruction, and an identity of the file system operation (e.g., delete file, write to file, move file, rename file, etc.) to be performed in accordance with the received file system instruction. Other parameters may be included with the call to file relationship preservation logic 30.

If one of the pluggable modules of file relationship preservation logic 30 determines that an existing, needed relationship involving file x will be lost if the received file system instruction is implemented, that pluggable module may generate additional file system instructions that, when implemented before and/or after implementing the received file system instruction, will preserve the existing, needed relationship involving file x. Otherwise, file relationship preservation logic 30 may return a message indicating that the received file system instruction can be implemented without any additional processing to preserve a relationship involving file x.

To determine whether a needed relationship exits for file x, preservation logic 30 accesses table 40 using an identity for file x. More particularly, one or more of the pluggable modules of preservation logic 30 may access table using the identity for file x. If file x is contained in an entry of table 40, one or more of the pluggable modules may generate one or more additional file system instructions that, when implemented before and/or after implementing the received file system instruction, preserve the relationship identified in the entry of table 40 that contains the identity of file x. Alternatively, one of the pluggable modules may generate an instruction to drop the received file system instruction if file x is contained in an entry of table 40. While file x may have a relationship with more than one file or other entity, or combination thereof, the present invention will be described with reference to file x having a relationship with only one other file (e.g., file y).

To illustrate the process shown in FIG. 5, suppose file system 22 receives a file system instruction to delete file Sc of file system 24 while file BB is in existence. File relationship table 40 indicates, however, there is a "needed-by" relationship between files Sc and BB within file system 24. When the instruction is received, file system logic 32 calls file relationship preservation logic 30 and forwards the identities of files Sc and BB along with an indication of the operation to be performed (e.g., delete file Sc). A pluggable module can exist in file relationship preservation logic 30 which is configured to prevent files from being deleted if the files have a "needed-by" relationship with another file or entity. This pluggable module is activated in response to the file relationship preservation logic 30 receiving the call from file system logic 30, and in response the pluggable module accesses relationship table 40 using the identity of the file sought to be deleted. Table 40 indicates a "needed-by" relationship between files Sc and BB. Because of this relationship, file Sc should not be deleted before file BB. In this situation, the relationship preservation logic 30 may generate a message in indicating that file BB is dependent on file Sc, and file Sc cannot be deleted before file BB in accordance with the received file system instruction.

In another example of the process shown in FIG. 5, suppose application z is installed in computer system 10, and suppose application z creates or installs several files in file system 24 for exclusive use by application z. Application z may directly or indirectly create entries within file relationship table 40 which indicate that certain files were installed-by, and accordingly modifiable only by application z. For example, entries 6 and 7 within table 40 indicate that files D and E are installed by application z. Suppose file system logic 30 receives a file system instruction that, when implemented, operates to write data to file D. Further suppose that this file system instruction was received, via operating system 20, from an application other than application z. In response to receiving this file system instruction, file system logic 32 calls file relationship preservation logic 30 and forwards the identity of file D along with an indication of the operation to be performed (e.g., write to file D). Further, file system logic 32 forwards an identification of the application seeking to write data to file D. A pluggable module can exist in file relationship preservation logic 30 which is configured to prevent files from being written to by applications other than application z. This pluggable module is activated in response to the file relationship preservation logic 30 receiving the call from file system logic 30, and in response the pluggable module accesses relationship table 40 using the identity of the file D. Table 40 indicates an "installed-by" relationship between file D and application z. Given these conditions, relationship preservation logic 30 will return a message indicating that the received file system instruction cannot or will not be implemented because of the installed-by relationship.

Data preservation logic 30 may determine that the file relationship identified in table 40 can be preserved if one or more additional file system instructions are implemented before or after the received file system instruction is implemented. The number and type of additional file system instructions needed depends on the type (e.g., delete, rename, move, etc.) of file system instruction received and/or the type of relationship (needed-by, refers-to, belongs-to, etc.) between files x and y identified in act 54.

To illustrate, suppose a set of files within file system 24 have a "belongs-to" relationship such that the files are required to be directly accessible by the same computer system. Entry 7 indicates that file H has a belongs-to relationship with file I. Suppose file system logic 30 receives a file system instruction to move file H to memory of another computer system (not shown). In response to receiving this file system instruction, file system logic 32 calls file relationship preservation logic 30 and forwards the identity of file H along with an indication of the operation to be performed (e.g., move file H to another computer system). A pluggable module can exist in file relationship preservation logic 30 which is configured to prevent a file from being moved to another computer system if the file has a "belongs-to" relationship with another file or entity. This pluggable module is activated in response to the file relationship preservation logic 30 receiving the call from file system logic 30, and in response the pluggable module accesses relationship table 40 using the identity of the file H. Table 40 indicates a "belongs-to" relationship between file H and file I. Given these conditions, relationship preservation logic 30 can generate an additional file system instruction to move file I to the other computer system in order to maintain the relationship between files H and I.

As another example, entry 8 of table 40 indicates that files J and K have a "refers-to" relationship with each other. In one embodiment, J and K may be HTML, PDF files that have some link which refer to each other. Suppose file system logic 30 receives a file system instruction to change the name of file K to P. In response to receiving this file system instruction, file system logic 32 calls file relationship preservation logic 30 and forwards the identity of file K along with an indication of the operation to be performed (e.g., rename to P). A pluggable module can exist in file relationship preservation logic 30 which is configured to modify references of files in other files. This pluggable module is activated in response to the file relationship preservation logic 30 receiving the call from file system logic 30, and in response the pluggable module accesses relationship table 40 using the identity of the file K. Table 40 indicates a "refers-to" relationship between file J and file K. Under these conditions, relationship preservation logic 30 will generate an additional file system instruction to replace the file K reference in file J with the new name of file K such that the refers-to relationships between files J and K are maintained after the rename instruction received in act 50 has been implemented.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   creating a first entry in a table within a memory;
   storing an identity of a first file and an identity of an application-related entity in the first entry of the table;
   storing first information that identifies a relationship between the application-related entity and the contents of the first file in the first entry of the table, wherein
the relationship comprises
a needed-by relationship,
a used-by relationship,
a refers-to relationship, or
a group-by relationship;
receiving a first instruction involving either the first file or the application-related entity, wherein
the first instruction, when implemented, performs a first operation adversely affecting the relationship;
in response to receiving the first instruction, identifying the relationship by accessing the table;
in response to identifying the relationship, selecting a second instruction, wherein
the second instruction is selected by determining the ability of the implementation of the second instruction to preserve the identified relationship,
the second instruction, when implemented, performs a second operation involving the first file or the application-related entity, and
the second instruction, when implemented, preserves the relationship between the first file and the application-related entity;
determining the order in which to implement the first and second instructions; and
implementing the first and second instructions in the determined order.

2. The method of claim 1 wherein the method is performed by a computer system, and wherein the computer system is in data communication with the memory that stores the table.

3. The method of claim 1 wherein the application-related entity is a computer executable application.

4. The method of claim 1 further comprising:
creating a second entry in the table;
storing an identity of a second file and a second application-related entity in the second entry of the table;
storing second information that identifies a relationship between the second file and the second application-related entity in the second entry of the file relationship, wherein the second information indicates that the second file contains data that is referred to by the second application-related entity.

5. The method of claim 4 further comprising:
creating a third application-related entry in the table;
storing third information that identifies a relationship between the first file and the second application-related entity in the third entry of the table.

6. The method of claim 1 wherein the first instruction is one to delete the first file and wherein the method further comprises:
accessing the first entry of the table using the identity of the first file and information that identifies a delete operation;
automatically selecting the second instruction based on the information that identifies the delete operation and the first information.

7. The method of claim 6 further comprising an act of comparing the identity of the first file with identities of files contained in a plurality of entries of the table.

8. A memory medium for storing instructions executable by a computer system, wherein the computer system implements a method in response to executing the instructions, the method comprising:
creating a first entry in a table within a memory;
storing an identity of a first file and an identity of an application-related entity in the first entry of the table;
storing first information that identifies a relationship between the application-related entity and the contents of the first file in the first entry of the table, wherein
the relationship comprises
a needed-by relationship,
a used-by relationship,
a refers-to relationship, or
a group-by relationship;
receiving a first instruction involving either the first file or the application-related entity, wherein
the first instruction, when implemented, performs a first operation adversely affecting the relationship;
in response to receiving the first instruction, identifying the relationship by accessing the table;
in response to identifying the relationship, selecting a second instruction, wherein
the second instruction is selected by determining the ability of the implementation of the second instruction to preserve the identified relationship,
the second instruction, when implemented, performs a second operation involving the first file or the application-related entity, and
the second instruction, when implemented, preserves the relationship between the first file and the application-related entity;
determining the order in which to implement the first and second instructions; and
implementing the first and second instructions in the determined order.

9. The memory medium of claim 8 wherein the method further comprises:
creating a second entry in the table;
storing an identity of a second file and a second application-related entity in the second entry of the table;
storing second information that identifies a relationship between the second file and the second application-related entity in the second entry of the table, wherein the second information indicates that the second file contains data that is referred to by the second application-related entity.

10. The memory medium of claim 8 wherein the first instruction is one to delete the first file and wherein the method further comprises:
accessing the first entry of the table using the identity of the first file and information that identifies a delete operation;
automatically selecting the second instruction based on the information that identifies the delete operation and the first information.

11. An apparatus comprising:
a first circuit for creating a first entry in a table within a memory;
a second circuit for storing an identity of a first file and an identity of an application-related entity and the contents of the first file in the first entry of the table;
a third circuit for storing first information that identifies a relationship between the application-related entity and the contents of the first file in the first entry of the table, wherein
the relationship comprises
a needed-by relationship,
a used-by relationship,
a refers-to relationship, or
a group-by relationship;
a fourth circuit for receiving a first instruction involving either the first file or the application-related entity, wherein the first instruction, when implemented, performs a first operation adversely affecting the relationship;

a fifth circuit for identifying the relationship by accessing the table in response to receiving the first instruction a sixth circuit for selecting a second instruction in response to identifying the relationship, wherein the second instruction is selected by determining the ability of the implementation of the second instruction to preserve the identified relationship, the second instruction, when implemented, performs a second operation involving the first file or the application-related entity, and the second instruction, when implemented, preserves the relationship between the first file and the application-related entity;

a seventh circuit for determining the order in which to implement the first and second instructions;

an eighth circuit for implementing the first instruction;

a ninth circuit for implementing the second instruction; and a tenth circuit comprised of the eighth and ninth circuits, wherein the first instruction and the second instruction are implemented in the determined order.

\* \* \* \* \*